US007940418B2

(12) United States Patent
Eom

(10) Patent No.: US 7,940,418 B2
(45) Date of Patent: May 10, 2011

(54) IMAGE CONTROL DEVICE FOR PRINTER AND METHOD OF COMPENSATING FOR LIGHT AMOUNT DRIFT OF PHOTOSENSOR USED IN THE IMAGE CONTROL DEVICE

(75) Inventor: Yoon-seop Eom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1077 days.

(21) Appl. No.: 11/152,160

(22) Filed: Jun. 15, 2005

(65) Prior Publication Data

US 2006/0007330 A1 Jan. 12, 2006

(30) Foreign Application Priority Data

Jul. 7, 2004 (KR) ........................ 10-2004-0052599

(51) Int. Cl.
*G06K 15/00* (2006.01)
*G06K 15/22* (2006.01)
*G03G 15/00* (2006.01)
*B41J 2/435* (2006.01)

(52) U.S. Cl. ........... 358/1.18; 358/1.4; 399/49; 347/246

(58) Field of Classification Search ........................ None
See application file for complete search history.

(56) References Cited

U.S. PATENT DOCUMENTS

| | | | | |
|---|---|---|---|---|
| 5,339,150 | A * | 8/1994 | Hubble et al. | 399/49 |
| 5,854,958 | A | 12/1998 | Tanimoto et al. | |
| 5,953,554 | A | 9/1999 | Ohnishi et al. | |
| 5,973,795 | A * | 10/1999 | Iida | 399/59 |
| 6,000,776 | A * | 12/1999 | Suzuki et al. | 347/19 |
| 6,044,234 | A | 3/2000 | Yoshizawa | |
| 6,168,325 | B1 * | 1/2001 | Nagata | 400/120.01 |
| 6,185,386 | B1 | 2/2001 | Noguchi | |
| 6,345,171 | B1 * | 2/2002 | Suga | 399/396 |
| 6,642,492 | B2 * | 11/2003 | Shiota et al. | 250/205 |
| 2003/0103220 | A1 | 6/2003 | Luxem et al. | |
| 2003/0200888 | A1 * | 10/2003 | Fukui | 101/484 |
| 2003/0214675 | A1 * | 11/2003 | Hatayama et al. | 358/1.18 |
| 2004/0126139 | A1 * | 7/2004 | Yoshizawa et al. | 399/149 |
| 2004/0208661 | A1 * | 10/2004 | Kitagawa et al. | 399/49 |

FOREIGN PATENT DOCUMENTS

| | | | |
|---|---|---|---|
| CN | 1235284 | A | 11/1999 |
| CN | 1479179 | A | 3/2004 |
| EP | 0944242 | A2 | 9/1999 |
| EP | 1 253 482 | A2 | 10/2002 |

(Continued)

*Primary Examiner* — Edward L Coles
*Assistant Examiner* — Vincent Rudolph
(74) *Attorney, Agent, or Firm* — Roylance, Abrams, Berdo and Goodman, LLP

(57) ABSTRACT

A method of compensating for a light amount drift of a photosensor used in an image control device, wherein the photosensor includes a light emitting portion and a light receiving portion which projects light onto an image control mark formed on an intermediate transfer medium of a printer and detects an optical signal reflected by the image control mark, thereby controlling the quality of an image. In the compensation method, the light amount drift is calculated by projecting light on the intermediate transfer medium, detecting an amount of light reflected by the intermediate transfer medium, and comparing the detected light amount with a pre-set reference light amount. The detected light amount is then corrected to be substantially equal to the reference light amount.

16 Claims, 5 Drawing Sheets

FOREIGN PATENT DOCUMENTS

| | | | |
|---|---|---|---|
| EP | 1 394 625 | A1 | 3/2004 |
| JP | 57-211873 | | 12/1982 |
| JP | 05-048834 | | 2/1993 |
| JP | 09-146330 | | 6/1997 |
| JP | 2003-150006 | | 5/2003 |
| JP | 2003-163792 | | 6/2003 |
| JP | 2004-125986 | | 4/2004 |
| KR | 1993-0004821 | | 3/1993 |
| KR | 10-2003-0020710 | A | 3/2003 |
| KR | 2003-0050979 | | 6/2003 |

* cited by examiner

IMAGE CONTROL DEVICE FOR PRINTER AND METHOD OF COMPENSATING FOR LIGHT AMOUNT DRIFT OF PHOTOSENSOR USED IN THE IMAGE CONTROL DEVICE

BACKGROUND OF THE INVENTION

This application claims the benefit under 35 U.S.C §119(a) of Korean Patent Application No. 10-2004-0052599, filed in the Korean Intellectual Property Office on Jul. 7, 2004, the entire disclosure of which is hereby incorporated by reference.

FIELD OF THE INVENTION

The present invention relates to an image control device for a printer and a method of compensating for a light amount drift of a photosensor used in the image control device.

DESCRIPTION OF THE RELATED ART

A printing machine, such as a printer or a copier, forms an electrostatic latent image by projecting an optical signal corresponding to image information onto a photosensitive medium that is charged with a uniform electrical potential using an exposing apparatus, forms a toner image by developing the electrostatic latent image using a developer, transfers the toner image to a recording medium directly or via an intermediate transfer medium, and fixes the toner image onto the recording medium by compressing and heating the toner image. In this way, the printing machine prints an image on the recording medium.

A color toner image on which yellow (Y), cyan (C), magenta (M), and black (K) toners are overlapped is thereby formed to print a color image. A printing process must be precisely controlled to form a color toner image on which color toners have been accurately overlapped to generate a high-quality image. Detection and adjustment of a color registration error is further needed to precisely control the printing process.

A color registration error is generated due to several factors, such as an error in localization of a plurality of developers that contain a plurality of color toners, an error in the manufacture of lenses used in an exposure apparatus, an error in the driving of a photosensitive medium or an intermediate transfer medium, and the like.

To generate a high-quality image, a concentration of an image must be appropriately adjusted. In other words, if an error is detected when a concentration of input image information is fully reflected in a toner image on an intermediate transfer medium, the error must be compensated for by adjusting the amount of exposed light, a developing bias applied to a developer, and the like.

In general, an image control mark including a color registration mark and an image concentration mark is formed on the intermediate transfer medium. A color registration error and an image concentration error can then be detected by detecting the image control mark using a photosensor. As shown in FIG. 1, a photosensor 3 comprises a light emitting portion 1 and a light receiving portion 2. Light emitted from the light emitting portion 1 is reflected by an image concentration mark (or a color registration mark) 5, which is formed on a transfer belt 4, and incident upon the light receiving portion 2. To accurately detect an image concentration (or a color registration error), the light emitting portion 1 and the light receiving portion 2 must be provided at a precise location during production of each photosensor 3. However, in practice, the location of each of the light emitting portion 1 and the light receiving portion 2 is can vary, or drift. A location of the image concentration mark (or the color registration mark) 5 of the photosensor 3 can also vary, or drift.

When the amount of light emitted from the light emitting portion 1 is constant, the amount of light detected by the light receiving portion 2 must be constant so that the color registration error and the image concentration error can be accurately detected. A drift of the location of either the light emitting portion 1 and the light receiving portion 2 impedes an accurate detection of the color registration error and the image concentration error. Thus, precise image control is difficult.

The installation of a compensation circuit (not shown) in the photosensor 3 may be considered to compensate for a drift of the location of each of the light emitting portion 1 and the light receiving portion 2. However, this solution increases the price of the photosensor 3. Also, even if the compensation circuit is used to compensate for the drift of the location of each of the light emitting portion 1 and the light receiving portion 2, the compensation circuit cannot compensate for a drift of the location of the image concentration mark (or the color registration mark) 5.

Accordingly, a need exists for a system and method for compensating for both a drift of locations of the light emitting portion and the light receiving portion of a photosensor, and a drift of a location of an image control mark with respect to the photosensor.

SUMMARY OF THE INVENTION

The present invention substantially solves the above and other problems, and provides a method of compensating for both a drift of locations of a light emitting portion and a light receiving portion of a photosensor, and a drift of a light amount detected by the light receiving portion caused due to a drift of a location of an image control mark with respect to the photosensor.

According to an aspect of the present invention, a method of compensating for a light amount drift of a photosensor used in an image control device is provided, wherein the photosensor comprises a light emitting portion and a light receiving portion and projects light onto an image control mark formed on an intermediate transfer medium of a printer and detects an optical signal reflected by the image control mark, thereby controlling a quality of an image. In the compensation method, the light amount drift is calculated by projecting light on the intermediate transfer medium, detecting an amount of light reflected by the intermediate transfer medium, and comparing the detected light amount with a pre-set reference light amount. The detected light amount is then corrected to be substantially equal to the reference light amount.

The detected light amount may also be corrected by controlling an amount of light emitted from the light emitting portion.

According to another aspect of the present invention, an image control device of a printer is provided, wherein the image control device comprises an image control mark formed on an intermediate transfer medium of the printer, a photosensor installed over the intermediate transfer medium, including a light emitting portion which projects light onto the image control mark and a light receiving portion which receives light reflected by the image control mark, a correction information calculator for calculating image correction information from an optical signal that is reflected by the image control mark and detected by the light receiving portion, a system controller for receiving the image correction information and controlling the printer based on the image correction information, a light amount drift calculator for calculating a light amount drift by comparing a light amount that is reflected by the intermediate transfer medium and detected by the light receiving portion with a pre-set reference light amount, and a light emission driver for controlling an amount of light emitted from the light emitting portion based on the light amount drift.

BRIEF DESCRIPTION OF THE DRAWINGS

The above and other features and advantages of the present invention will become more apparent by describing in detail exemplary embodiments thereof with reference to the attached drawings in which.

Throughout the drawings, like reference numerals will be understood to refer to like parts, components and structures.

DETAILED DESCRIPTION OF EXEMPLARY EMBODIMENTS

Figure 2:
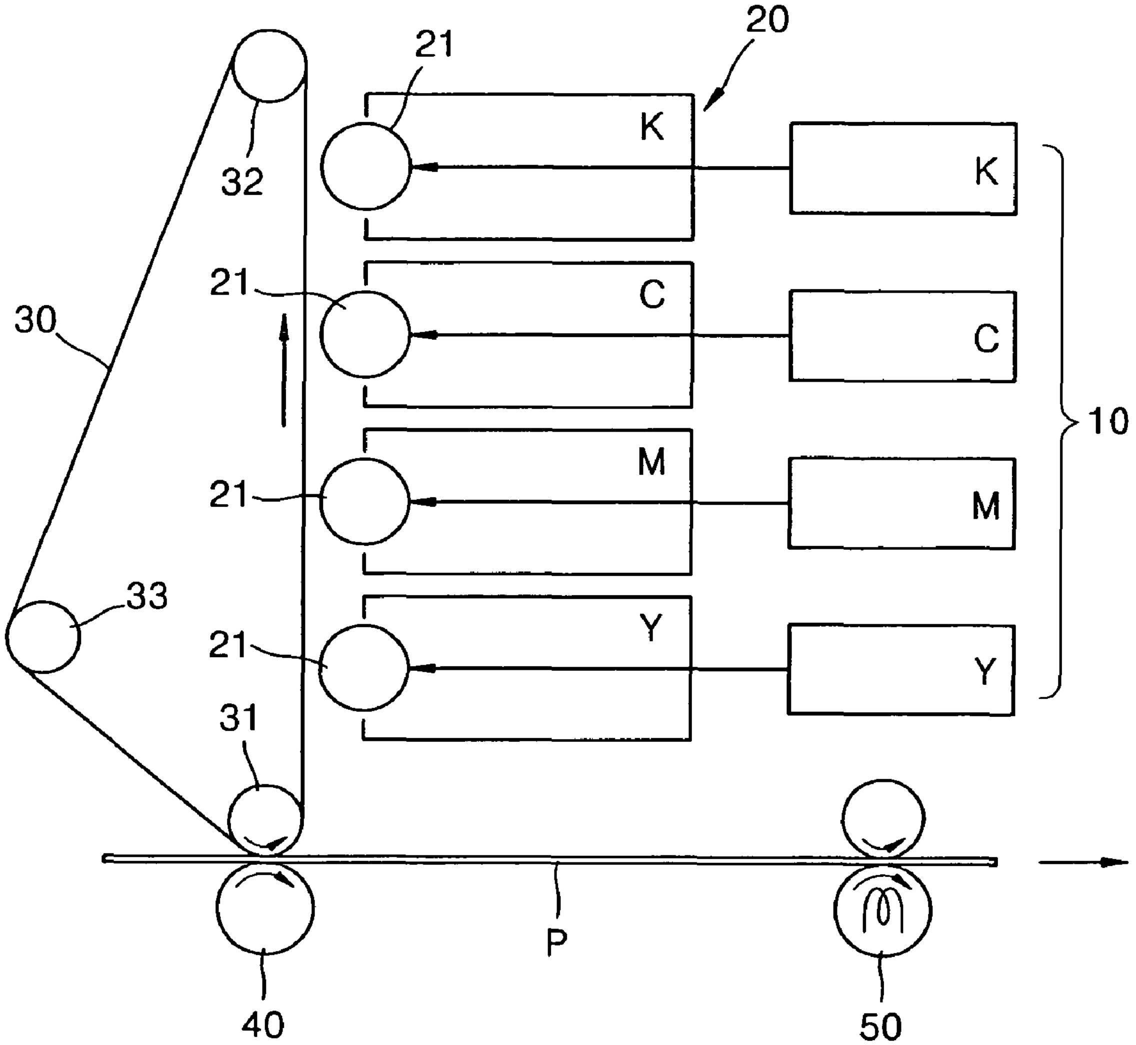
FIG. 2 (Prior Art)
FIG. 2 is a construction diagram of an example of a conventional printer.

Referring to FIG. 2, a conventional printer includes optical scan devices 10Y, 10M, 10C, and 10K, four developing cartridges 20Y, 20M, 20C, and 20K, which store yellow (Y), magenta (M), cyan (C), and black (K) toners, respectively, a transfer belt (intermediate transfer medium) 30, a transfer roller 40, and a fixing device 50. The transfer belt 30 is supported and circulated by support rollers 31, 32, and 33. A transfer drum (not shown) may be used as the intermediate transfer medium. Although not shown in detail, each of the optical scan devices 10Y, 10M, 10C, and 10K includes a polygon mirror which deflects light emitted from a light source in a main scan direction, and a reflective mirror which controls a path of the deflected light.

The optical scan device 10Y sends light corresponding to image information of a Y color over a photosensitive drum 21 of the developing cartridge 20Y that is charged with a uniform potential to form an electrostatic latent image. The Y toner contained in the developing cartridge 20Y is attached to the electrostatic latent image to form a Y toner image. The Y toner image is then transferred to the transfer belt 30.

The optical scan device 10M then sends light corresponding to image information of an M color over a photosensitive drum 21 of the developing cartridge 20M that is charged with a uniform potential to form an electrostatic latent image. The M toner contained in the developing cartridge 20M is attached to the electrostatic latent image to form an M toner image. The M toner image is then transferred to the transfer belt 30. The moment that the optical scan device 10M is to start operating is controlled so that the Y toner image already transferred to the transfer belt 30 can be accurately overlapped by the M toner image. More specifically, the moment that an operation of the optical scan device 10M is to start is controlled so that when a leading end of the Y toner image already transferred to the transfer belt 30 reaches a location (such as a transfer nip) where the photosensitive drum 21 of the developing cartridge 20M faces the transfer belt 30, a leading end of the M toner image developed by the photosensitive drum 21 of the developing cartridge 20M can also reach the transfer nip.

In a similar manner, C and K color toner images are also formed and transferred to the transfer belt 30 so that a color toner image, on which the Y, M, C, and K color toner images are overlapped, is formed on the transfer belt 30. The color toner image is then transferred onto the paper P that passes between the transfer roller 40 and the support roller 31. When the paper P passes by the fixing device 50, the color toner image is fixed onto the paper P by heat and pressure, thereby completing color printing.

Figure 3:
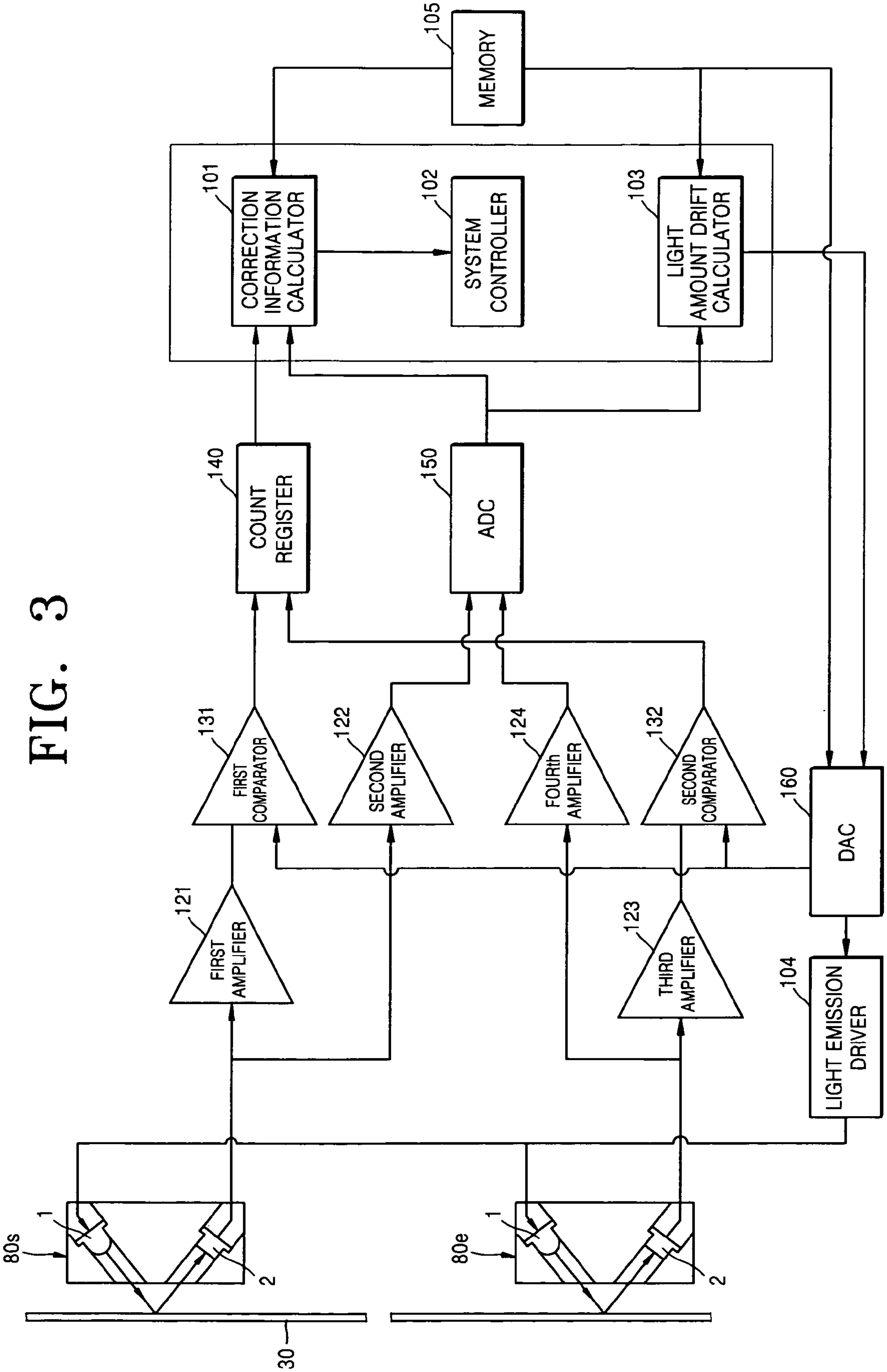
FIG. 3 is a block diagram of an image control device according to an embodiment of the present invention.
Figure 4:
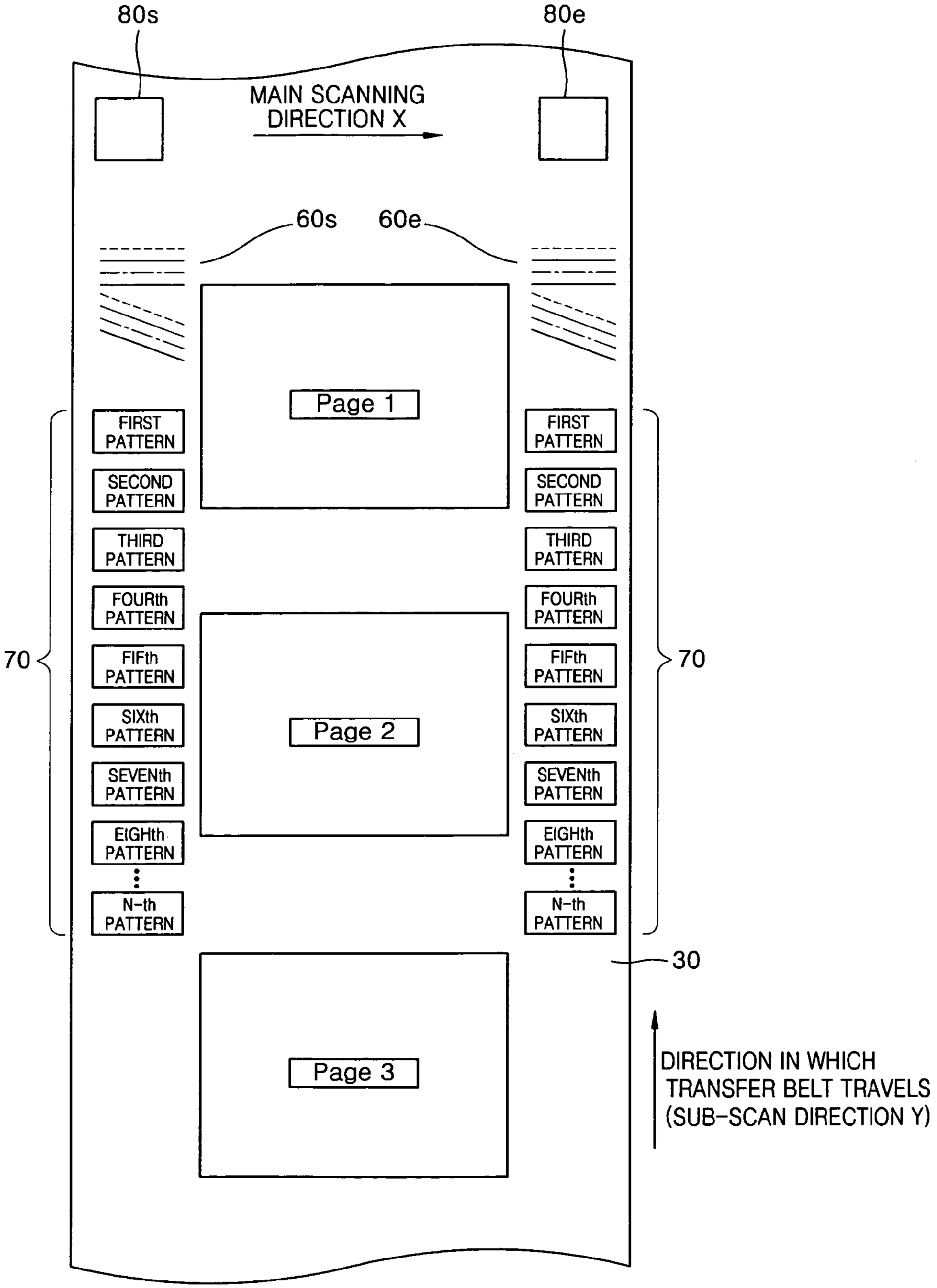
FIG. 4 is a plan view of an example of an image control mark according to an embodiment of the present invention.

In addition to the above features, an image control device in accordance with an embodiment of the present invention can be installed in the printer to control a quality of an image. As shown in FIGS. 3 and 4, an image control device according to an embodiment of the present invention comprises an image control mark formed on the transfer belt 30, photosensors 80*s* and 80*e* for detecting the image control mark, a correction information calculator 101, and a system controller 102. The image control mark is comprised of the image concentration mark 70 and color registration marks 60*s* and 60*e* of FIG. 4.

The image concentration mark 70 is used to detect whether a concentration of input image information is fully reflected in a toner image formed on the transfer belt 30. The image concentration mark 70 may be formed on one or both sides of the transfer belt 30. As shown in FIG. 4, the image concentration mark 70 comprises a plurality of gray patterns (First through N-th patterns) having different concentrations.

Figure 5:
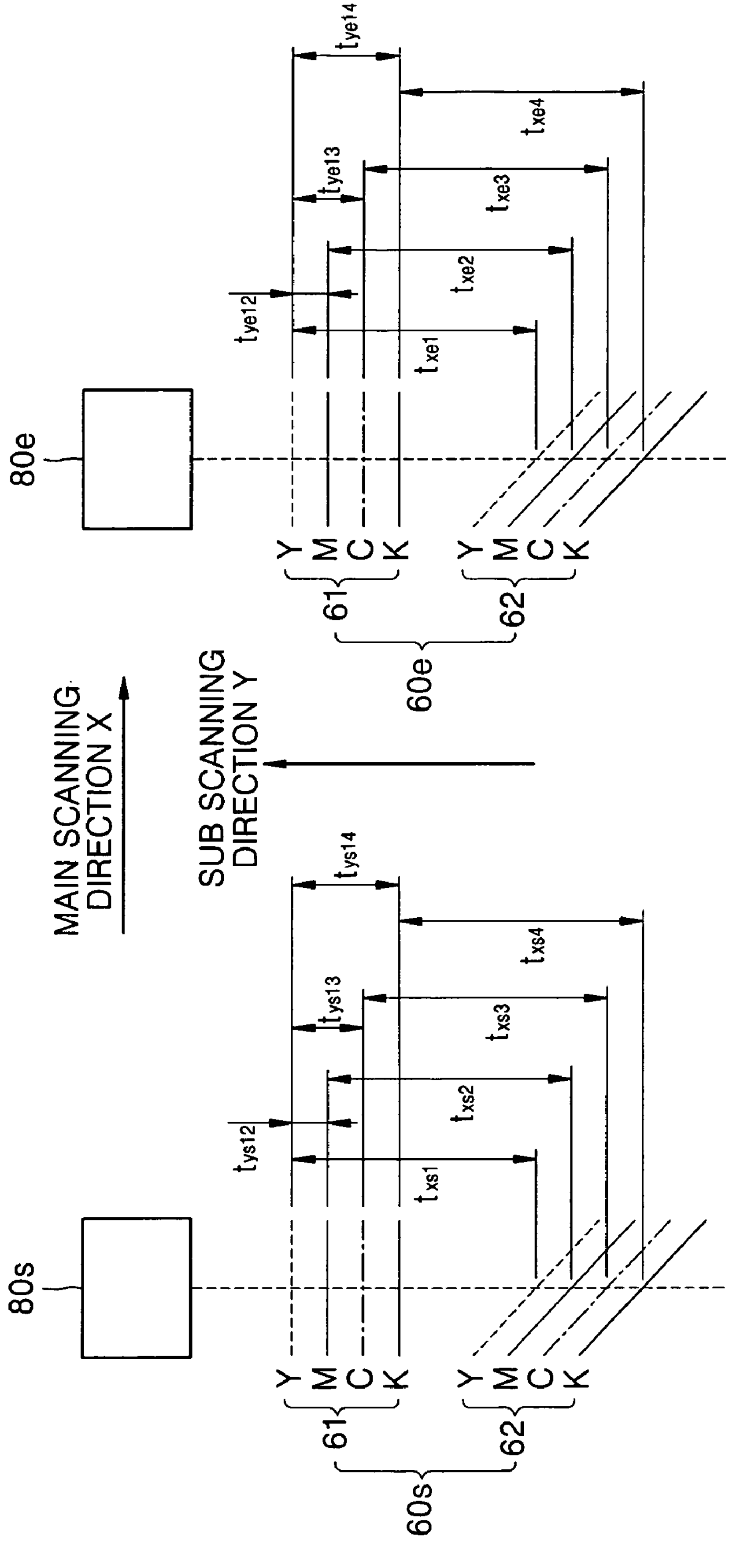
FIG. 5 is a diagram of an example of a color registration mark according to an embodiment of the present invention.

The color registration marks 60*s* and 60*e* are used to control the Y, M, C, and K toner images to be transferred onto the transfer belt 30 in such a way that the toner images are accurately overlapped one upon another. Referring to FIG. 4, the color registration marks 60*s* and 60*e* are formed on side portions of the transfer belt 30. An embodiment of the color registration marks 60*s* and 60*e* is shown in greater detail in FIG. 5. Referring to FIG. 5, the color registration marks 60*s* and 60*e* are arranged on both side portions of the transfer belt 30 in a main scan direction X. Each of the color registration marks 60*s* and 60*e* comprises Y, M, C, and K components 61 in the main scan direction X, and Y, M, C, and K components 62 in an aslant direction.

Figure 1:
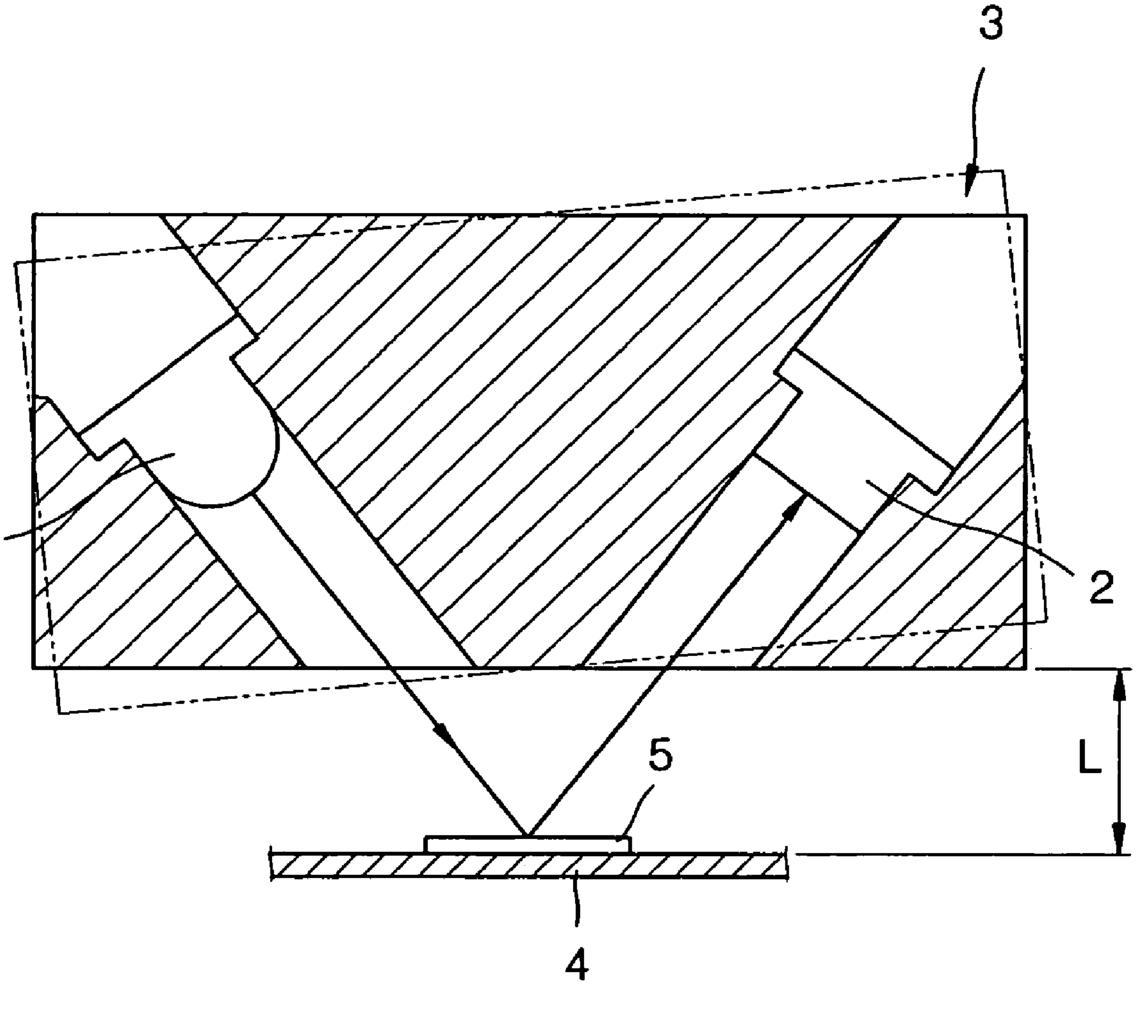
FIG. 1 (Prior Art)
FIG. 1 is a cross-section view of an example of a conventional photosensor.

Referring back to FIG. 3, the photosensors 80*s* and 80*e* are installed over the transfer belt 30 and detect the image concentration mark 70 and the color registration marks 60*s* and 60*e*. The photosensors 80*s* and 80*e* of FIG. 3 may be constructed substantially the same as the photosensor 3 of FIG. 1, including the light emitting portion 1 and the light receiving portion 2. The correction information calculator 101 calculates color registration correction information and image concentration correction information from an optical signal that is reflected by the color registration marks 60*s* and 60*e* and the image concentration mark 70, and subsequently detected by the light receiving potion 2. The system controller 102 receives the color registration correction information and the image concentration correction information, and controls the printer accordingly. More specifically, based on the color registration correction information and the image concentration correction information, the system controller 102 controls system control elements, such as the starting time of the optical scan devices 10Y, 10M, 10C, and 10K, a driving speed of the transfer belt 30, a development voltage applied to the developing cartridges 20Y, 20M, 20C, and 20K to attach toners onto the photosensitive drums 21, a transfer voltage used to transfer toner images on the photosensitive drums 21 to the transfer belt 30, and the like.

Optical signals reflected by the image concentration marks 70 and detected by the light receiving portions 2 of the photosensors 80*s* and 80*e* pass through first and third amplifiers 121 and 123 as described in greater detail below, and also pass through second and fourth amplifiers 122 and 124, respectively. After passing through the second and fourth amplifiers 122 and 124, the optical signals are passed through an analog-to-digital converter (ADC) 150 and are then input to the correction information calculator 101. The correction information calculator 101 calculates the image concentration correction information from a difference between a detected concentration value calculated from a level of a signal received from the ADC 150, and a reference concentration value pre-stored, for example, in a memory 105. The system controller 102 then controls system control elements, such as a developing voltage, a transfer voltage, and the like, based on the image concentration correction information.

As noted above, the optical signals reflected by the color registration marks 60*s* and 60*e* and detected by the light receiving portions 2 of the photosensors 80*s* and 80*e* also pass through first and third amplifiers 121 and 123, respectively, and are then input to first and second comparators 131 and 132, respectively. The optical signals comprise, for example, voltage signals that are proportional to a detected amount of light. A digital-to-analog converter (DAC) 160 converts a threshold value that is pre-stored in the memory 105 into a threshold voltage and provides the threshold voltage to the first and second comparators 131 and 132. The first and second comparators 131 and 132 compare the voltage signals with the threshold voltage. If the voltage signals are higher than the threshold voltage, the first and second comparators 131 and 132 output high (H) signals. If the voltage signals are lower than the threshold voltage, the first and second comparators 131 and 132 output low (L) signals. The output signals of the first and second comparators 131 and 132 are input to a count register 140. If the color registration marks 60*s* and 60*e* are detected and the first and second comparators 131 and 132 output L signals, the count register 140 counts a time interval between the L signals.

Accordingly, as shown in FIG. 5, time intervals txs1, txs2, txs3, and txs4 between the first, second, third, and fourth color marks Y, M, C, and K components of 61 and 62 in the main scan direction X and in the aslant direction of the color registration mark 60*s* are detected. Time intervals tys12, tys13, and tys14 between the first and second color marks Y and M components of 61, between the first and third color marks Y and C components of 61, and between the first and fourth color marks Y and K components of 61, respectively, are also detected. Time intervals txe1, txe2, txe3, and txe4 between the first, second, third, and fourth color marks Y, M, C, and K components of 61 and 62 in the main scan direction X and in the aslant direction of the color registration mark 60*e* are also detected. Time intervals tye12, tye13, and tye14 between the first and second color marks Y and M components of 62, between the first and third color marks Y and C components of 62, and between the first and fourth color marks Y and K components of 62, respectively, are also detected.

Examples of the color registration correction information comprise an X offset, a Y offset, a printing width error, and a skew error. The correction information calculator 101 calculates the color registration correction information, namely, the X offset, the Y offset, the printing width error, and the skew error, based on relational expressions as shown in Table 1. In Table 1, Ty2, Ty3, and Ty4 denote reference values of time intervals between the first and second color marks Y and M components of 61, between the first and third color marks Y and C components of 61, and between the first and fourth color marks Y and K components of 61, respectively.

TABLE 1

| | X-OFFSET | Y-OFFSET | Printing width error | Skew error |
|---|---|---|---|---|
| M color | txs1-txs2 | Ty2-tys12 | (txs1-txe1)−(txs2-txe2) | tys12-tye12 |
| C color | txs1-txs3 | Ty3-tys13 | (txs1-txe1)−(txs3-txe3) | tys13-tye13 |
| K color | txs1-txs4 | Ty4-tys14 | (txs1-txe1)−(txs4-txe4) | tys14-tye14 |

The system controller 102 controls the printer to compensate for the X offset, the Y offset, the printing width error, and the skew error. The X offset of the second color mark M is an error in the main scan direction X. If the X offset of the second color mark M is negative, the second color mark M is shifted in −X direction. If the X offset of the second color mark M is positive, the second color mark M is shifted in +X direction. The system controller 102 controls the optical scan device 10M so that a scan line of the optical scan device 10M is moved in the +X or −X direction. An example of a method of compensating for an X offset will now be described in greater detail.

The system controller 102 has a left margin register value to determine a left margin of printing areas, namely, pages 1, 2, and 3. The system controller 102 adjusts the X offset by controlling the moment that the optical scan device 10M starts main scanning based on the left margin register value. If a basic value of the left margin register value is 500 for example, the system controller 102 sets a left margin register value to be, for example, 400 or 600, to compensate for the detected X offset. If the left margin register value is set to be 400, a location where the optical scan device 10M starts scanning is moved by 100 dots in the −X direction. If the left margin register value is set to be 600 for example, a location where the optical scan device 10M starts scanning is moved by 100 dots in the +X direction. This method is similarly used to compensate for the X offsets of the third and fourth color marks C and K.

A negative Y offset denotes a page delay, so an error in a sub-scan direction can be reduced by advancing a page. A positive Y offset denotes a page advance, so the error in the sub-scan direction can be reduced by delaying a page. An example of a method of compensating for a Y offset will now be described in greater detail.

The system controller 102 has a top margin register value to determine a top margin of printing areas, namely, pages 1, 2, and 3. The system controller 102 adjusts the Y offset by controlling the moment that the optical scan device 10M starts main scanning based on the top margin register value. If a basic value of the top margin register value is 100 for example, the system controller 102 sets a top margin register value to be, for example, 120 or 80, to compensate for the detected Y offset. If the top margin register value is set to be 120 for example, the optical scan device 10M is delayed by 20 dots and then starts scanning. Hence, a page is moved by 20 dots in −Y direction. If the top margin register value is set to be 80 for example, the optical scan device 10M is advanced by 20 dots and starts scanning. Hence, a page is moved by 20 dots in the +Y direction. This method is similarly used to compensate for the Y offsets of the third and fourth color marks C and K.

If a printing width error has a negative value, a distance in the main scanning direction X between the second color marks M of the color registration marks 60*s* and 60*e*, is greater than a distance in the main scanning direction X between the first color marks Y of the color registration marks 60*s* and 60*e*. In this case, a printing width needs to be reduced. If a printing width error has a positive value, a printing width needs to be increased. An example of a method of compensating for a printing width error will now be described in greater detail.

The printing width error is compensated for by controlling a scan speed. A scan speed of the optical scan device 10M depends on a rotating speed of a polygon mirror (not shown) and a clock frequency of an image information signal. If the time required to scan a single dot is basically 100 ns for example, the time is increased to, for example, 120 ns, to increase the printing width. To increase the time to 120 ns, the clock frequency of the image information signal is set to be 1/120 ns, and the rotating speed of the polygon mirror is decreased in proportion to the 1/120 ns clock frequency. The time required to scan a single dot is set to, for example, 80 ns, to decrease the printing width. To decrease the time to 80 ns, the clock frequency of the image information signal is set to be 1/80 ns, and the rotating speed of the polygon mirror is increased in proportion to the 1/80 ns clock frequency.

Even when the three errors (X offset, Y offset, and printing width errors) are not generated, a skew, in which main scan lines are inclined due to scan errors or the like of the optical scan devices 10Y, 10M, 10C, and 10K, may be generated. If the skew error has a negative value, a skew in which the main scan lines are inclined in the −Y direction when going in the +X direction is generated. However, if the skew error has a positive value, a skew in which the main scan lines are inclined in the +Y direction when going in the +X direction is generated. Generally, the skew error cannot be compensated for during printing. During the manufacture of a printer, angles at which reflective mirrors are installed within the optical scan devices 10Y, 10M, 10C, and 10K are controlled to measure a skew error and compensate for the measured skew error.

Although the amount of light emitted from the light emitting portions 1 of each of the photosensors 80*s* and 80*e* is preferably constant, a variation or drift of the amount of the emitted light may be generated, such as due to manufacturing tolerances of the photosensors 80*s* and 80*e*. When the photosensors 80*s* and 80*e* are installed, they may be inclined or drift thereby affecting a distance (L) between each of the photosensors 80*s* and 80*e* and the transfer belt 30 as indicated by a dotted line of FIG. 1. Even if a driving current value input to the light emitting portion 1 is constant, these drifts may cause a drift of the amount of light detected by the light receiving portion 2 (hereinafter, referred to as a light amount drift). The light amount drift causes color registration correction information and image concentration correction information to be inaccurately calculated.

To prevent this problem, the image control device according to an embodiment of the present invention further comprises a light amount drift calculator 103 for calculating a light amount drift, and a light emission driver 104 for controlling the amount of light emitted from the light emitting portion 1 of each of the photosensors 80*s* and 80*e* based on the calculated light amount drift. To compensate for the light amount drift, the image control device detects the amount of light reflected by the transfer belt 30 instead of forming a special light amount drift correction pattern on the transfer belt 30. The image control device then compensates for the light amount drift by controlling the amount of light emitted from the light emitting portion 1.

A method of compensating for a light amount drift of a photosensor will now be described in greater detail. The image control device compensates for the light amount drift of each of the photosensors 80*s* and 80*e* before detecting an image control mark and calculating image correction information. The light emitting portion 1 of each of the photosensors 80*s* and 80*e* projects light onto the transfer belt 30, and the light receiving portion 2 thereof detects an optical signal reflected by the transfer belt 30. The optical signal is input to the ADC 150 via the second and fourth amplifiers 122 and 124. A signal output by the ADC 150 is input to the light amount drift calculator 103. The light amount drift calculator 103 calculates a light amount from a level of the signal received from the ADC 150 and compares the calculated light amount with a reference light amount pre-set in the memory 105 to calculate a light amount drift. To compensate for the light amount drift, the light amount drift calculator 103 outputs a light emission control signal for controlling the amount of light emitted from the light emitting portion 1. The light emission driver 104 controls the amount of light emitted from the light emitting portion 1 by increasing or decreasing a current value supplied to the light emitting portion 1 according to the received light emission control signal. This process repeats until the amount of light that is reflected by the transfer belt 30 and detected by the light receiving portion 2 is substantially the same as a reference light amount.

As described above, in an image control device and method of compensating for a light amount drift of a photosensor used in the image control device according to the present invention, a light amount drift due to a drift of the amount of light emitted from a light emitting portion of the photosensor, a light amount drift due to a drift of the location of each of the light emitting portion and a light receiving portion of the photosensor, and a light amount drift due to a drift of the location of the photosensor, can all be effectively compensated. Further, the precision required to manufacture the photosensor can be lowered, and the price of the photosensor can be further reduced as a compensation circuit is no longer required.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. An image forming apparatus, comprising:

an intermediate transfer medium movable in a sub-scanning direction and on which a toner image is transferred;

a first photosensor including a first light emitting portion for projecting light upon a first side region of the intermediate transfer medium, and a first light receiving portion for receiving light reflected thereby;

a second photosensor including a second light emitting portion for projecting light upon a second side region of the intermediate transfer medium, and a second light receiving portion for receiving light reflected thereby; and a control unit configured to perform calibration of the first photosensor by (i) using the first light emitting portion of the first photosensor to emit light directly upon an unmarked surface of the intermediate transfer medium, (ii) using the first light receiving portion of the first photosensor to detect an amount of light reflected directly from the unmarked surface of the intermediate transfer medium, and (iii) controlling an amount of light emitted from the first light emitting portion of the first photosensor such that the amount of reflected light detected by the first light receiving portion of the first photosensor is substantially equal to a pre-set reference light amount so as to calibrate the first photosensor, wherein the control unit is further configured to perform calibration of the second photosensor by (i) using the second light emitting portion of the second photosensor to emit light directly upon an unmarked surface of the intermediate transfer medium, (ii) using the second light receiving portion of the second photosensor to detect an amount of light reflected directly from the unmarked surface of the intermediate transfer medium, and (iii) controlling an amount of light emitted from the second light emitting portion of the second photosensor such that the amount of reflected light detected by the second light receiving portion of the second photosensor is substantially equal to a pre-set reference light amount so as to calibrate the second photosensor, wherein, after calibration of the first photosensor and the second photosensor, the control unit is configured to control forming toner images representing a first set of image concentration marks comprising a plurality of gray patterns having different concentrations and a second set of image concentration marks comprising a plurality of gray patterns having different concentrations on the image intermediate transfer medium as the intermediate transfer medium is moved in the sub-scanning direction, wherein the first set of image concentration marks and the second set of image concentration marks are separated from each other in a main-scanning direction, wherein, the control unit is configured to control forming toner images representing a first set of registration marks comprising four different colors and a second set of registration marks comprising four different colors on the intermediate transfer medium as the intermediate transfer medium is moved in the sub-scanning direction, wherein the first set of registration marks and the second set of registration marks are separated from each other in a main-scanning direction, wherein the first set of registration marks and the first set of image concentration marks are arranged at the first side region of the intermediate transfer medium so as to be detected by the first photosensor, and wherein the second set of registration marks and the second set of image concentration marks are arranged at the second side region of the intermediate transfer medium so as to be detected by the second photosensor, and wherein a color registration error and an image concentration error are compensated based on information obtained via detection of the toner images representing (i) the first set of registration marks, (ii) the first set of image concentration marks, (iii) the second set of registration marks, and (iv) the second set of image concentration marks formed on the intermediate transfer medium.

2. The image forming apparatus of claim 1, wherein the control unit comprises:

a light amount drift calculator for calculating a first light amount drift of the first photosensor by comparing a light amount that is projected directly upon an unmarked surface of the intermediate transfer medium and reflected directly from the unmarked surface of the intermediate transfer medium and detected by the first light receiving portion with the pre-set reference light amount for calibration of the first photosensor; and a light emission driver for adjusting an amount of light emitted from the first light emitting portion of the first photosensor, during the calibration thereof, based on the first light amount drift such that, when the adjusted amount of light emitted from the first light emitting portion of the first photosensor is reflected directly from the unmarked surface of the intermediate transfer medium, the reflected light detected by the first light receiving portion, after calibration thereof, is substantially equal to the pre-set reference light amount.

3. The image forming apparatus of claim 2, wherein:

the light amount drift calculator is further configured to calculate a second light amount drift of the second photosensor by comparing a light amount that is projected directly upon an unmarked surface of the intermediate transfer medium and reflected directly from the unmarked surface of the intermediate transfer medium and detected by the second light receiving portion with the pre-set reference light amount for calibration of the second photosensor, and the light emission driver adjusts an amount of light emitted from the second light emitting portion of the second photosensor, during the calibration thereof, based on the second light amount drift such that, when the adjusted amount of light emitted from the second light emitting portion of the second photosensor is reflected directly from the unmarked surface of the intermediate transfer medium, the reflected light detected by the second light receiving portion, after calibration thereof, is substantially equal to the pre-set reference light amount.

4. The image forming apparatus of claim 3, wherein the light emission driver is configured to control the amount of light emitted from the second emitting portion of the second photosensor by increasing or decreasing a current value supplied to the second light emitting portion.

5. The image forming apparatus of claim 2, wherein the light emission driver is configured to control the amount of light emitted from the first emitting portion of the first photosensor by increasing or decreasing a current value supplied to the first light emitting portion.

6. The image forming apparatus of claim 1, wherein the first set of image concentration marks and the second set of image concentration marks are formed on opposite sides of the intermediate transfer medium separated in the main scanning direction.

7. The image forming apparatus of claim 6, wherein the plurality of gray patterns having different concentrations are arranged in the sub-scanning direction.

8. The image forming apparatus of claim 7, wherein each of the first and second sets of image concentration marks comprises image concentration marks for four different colors.

9. A method for use in an image forming apparatus, the method comprising:

calibrating a first photosensor by (i) using a first light emitting portion of the first photosensor to emit light directly upon an unmarked surface of an intermediate transfer medium, (ii) using a first light receiving portion of the first photosensor to detect an amount of light reflected directly from the unmarked surface of the intermediate transfer medium, and (iii) controlling an amount of light emitted from the first light emitting portion of the first photosensor such that the amount of reflected light detected by the first light receiving portion of the first photosensor is substantially equal to a pre-set reference light amount so as to calibrate the first photosensor; and calibrating a second photosensor by (i) using a second light emitting portion of the second photosensor to emit light directly upon an unmarked surface of the intermediate transfer medium, (ii) using a second light receiving portion of the second photosensor to detect an amount of light reflected directly from the unmarked surface of the intermediate transfer medium, and (iii) controlling an amount of light emitted from the second light emitting portion of the second photosensor such that the amount of reflected light detected by the second light receiving portion of the second photosensor is substantially equal to a pre-set reference light amount so as to calibrate the second photosensor, wherein, after calibration of the first photosensor and the second photosensor, the method further comprises:

forming toner images representing a first set of image concentration marks comprising a plurality of gray patterns having different concentrations and a second set of image concentration marks comprising a plurality of gray patterns having different concentrations on the image intermediate transfer medium as the intermediate transfer medium is moved in the sub-scanning direction, wherein the first set of image concentration marks and the second set of image concentration marks are separated from each other in a main-scanning direction;

forming toner images representing a first set of registration marks comprising four different colors and a second set of registration marks comprising four different colors on the intermediate transfer medium as the intermediate transfer medium is moved in the sub-scanning direction, wherein the first set of registration marks and the second set of registration marks are separated from each other in a main-scanning direction, wherein the first set of registration marks and the first set of image concentration marks are arranged at the first side region of the intermediate transfer medium so as to be detected by the first photosensor, and wherein the second set of registration marks and the second set of image concentration marks are arranged at the second side region of the intermediate transfer medium so as to be detected by the second photosensor; and compensating a color registration error and an image concentration error based on information obtained via detection of the toner images representing (i) the first set of registration marks, (ii) the first set of image concentration marks, (iii) the second set of registration marks, and (iv) the second set of image concentration marks formed on the intermediate transfer medium.

10. The method of claim 9, further comprising:

calculating a first light amount drift of the first photosensor by comparing a light amount that is projected directly upon an unmarked surface of the intermediate transfer medium and reflected directly from the unmarked surface of the intermediate transfer medium and detected by the first light receiving portion with the pre-set reference light amount for calibration of the first photosensor; and adjusting an amount of light emitted from the first light emitting portion of the first photosensor, during the calibration thereof, based on the first light amount drift such that, when the adjusted amount of light emitted from the first light emitting portion of the first photosensor is reflected directly from the unmarked surface of the intermediate transfer medium, the reflected light detected by the first light receiving portion, after calibration thereof, is substantially equal to the pre-set reference light amount.

11. The method of claim 10, wherein the adjusting an amount of light emitted from the first light emitting portion of the first photosensor comprises controlling the amount of light emitted from the first emitting portion of the first photosensor by increasing or decreasing a current value supplied to the first light emitting portion.

12. The method of claim 9, further comprising:

calculating a second light amount drift of the second photosensor by comparing a light amount that is projected directly upon an unmarked surface of the intermediate transfer medium and reflected directly from the unmarked surface of the intermediate transfer medium and detected by the second light receiving portion with the pre-set reference light amount for calibration of the second photosensor; and adjusting an amount of light emitted from the second light emitting portion of the second photosensor, during the calibration thereof, based on the second light amount drift such that, when the adjusted amount of light emitted from the second light emitting portion of the second photosensor is reflected directly from the unmarked surface of the intermediate transfer medium, the reflected light detected by the second light receiving portion, after calibration thereof, is substantially equal to the pre-set reference light amount.

13. The method of claim 12, wherein the adjusting an amount of light emitted from the second light emitting portion of the second photosensor comprises controlling the amount of light emitted from the second emitting portion of the second photosensor by increasing or decreasing a current value supplied to the second light emitting portion.

14. The method of claim 9, wherein the first set of image concentration marks and the second set of image concentration marks are formed on opposite sides of the intermediate transfer medium separated in the main scanning direction.

15. The method of claim 14, wherein the plurality of gray patterns having different concentrations are arranged in the sub-scanning direction.

16. The method of claim 15, wherein each of the first and second sets of image concentration marks comprises image concentration marks for four different colors.

* * * * *